(12) United States Patent
Rutledge (10) Patent No.: US 8,713,265 B1
(45) Date of Patent: Apr. 29, 2014

(54) VISUAL INDICATOR OF ONLINE BACKUP

(75) Inventor: Matthew G. Rutledge, Brea, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 240 days.

(21) Appl. No.: 12/887,341

(22) Filed: Sep. 21, 2010

(51) Int. Cl.
*G06F 12/16* (2006.01)
*G06F 11/14* (2006.01)

(52) U.S. Cl.
CPC .... *G06F 11/1456* (2013.01); *G06F 2203/0337* (2013.01)
USPC .......................................... 711/162

(58) Field of Classification Search
CPC ..................... G06F 11/1456; G06F 2203/0337
See application file for complete search history.

(56) References Cited

U.S. PATENT DOCUMENTS

| | | | |
|---|---|---|---|
| 5,896,256 A | 4/1999 | Lang et al. | |
| 5,986,992 A | 11/1999 | Bardmesser | |
| 6,615,244 B1 | 9/2003 | Singhal | |
| 6,658,577 B2 | 12/2003 | Huppi et al. | |
| 6,684,229 B1 | 1/2004 | Luong et al. | |
| 7,031,988 B2 | 4/2006 | Kusama et al. | |
| 7,085,968 B2 * | 8/2006 | Smith | 714/57 |
| 7,146,387 B1 | 12/2006 | Russo et al. | |
| 7,287,133 B2 | 10/2007 | Rowan et al. | |
| 7,302,579 B1 * | 11/2007 | Cain et al. | 713/182 |
| 7,346,790 B1 * | 3/2008 | Klein | 713/320 |
| 7,349,719 B2 * | 3/2008 | Buniatyan | 455/557 |
| 7,558,840 B1 | 7/2009 | Howard et al. | |
| 2004/0044383 A1 | 3/2004 | Woods et al. | |
| 2004/0075700 A1 | 4/2004 | Liu et al. | |
| 2004/0080403 A1 | 4/2004 | Eshel | |
| 2004/0136224 A1 | 7/2004 | Hamer et al. | |
| 2005/0102603 A1 | 5/2005 | Tapper et al. | |
| 2005/0131996 A1 | 6/2005 | Mastrianni et al. | |
| 2008/0270718 A1 | 10/2008 | Stocklein et al. | |
| 2009/0187720 A1 | 7/2009 | Hong et al. | |
| 2009/0307333 A1 | 12/2009 | Welingkar et al. | |
| 2010/0257142 A1 * | 10/2010 | Murphy et al. | 707/681 |

* cited by examiner

*Primary Examiner* — Duc Doan

(57) ABSTRACT

The embodiments provide an external drive that is configured to coordinate with an online data backup service and having a visual or an audiovisual indication of the status and progress of the backup. In particular, upon the user's request or as an automatic function, the external drive backs up its contents to a backup storage. In some embodiments, the backup storage is provided by an online backup service remotely via a network, such as the Internet. The external drive comprises a visual or an audiovisual indicator, such as one or more indicator lights, that provide a status of the backup. The various stages of the backup process may be indicated, for example, by changes in the color of the indicator lights, flashing patterns, or any combination of these indication signals.

20 Claims, 9 Drawing Sheets

(DRIVE HAS OWN NETWORK CONNECTION)

(DRIVE TETHERED TO HOST)

FIG. 1A

(DRIVE HAS OWN NETWORK CONNECTION)

FIG. 1B

(STAND-ALONE MODE)

VISUAL INDICATOR OF ONLINE BACKUP

BACKGROUND

Today, users keep a large number of files, data, and content, such as documents, music, video, movies, etc. Typically, most users store their files on hard drives, memory sticks, and other storage media, such as CDs, DVDs, magnetic tapes, etc. Many of these files, such as pictures, financial documents, etc. may be valuable to the user. Accordingly, many users are now using backup services either locally or remotely over a network, such as the Internet. Remote or online backup services have become popular because of their ability to provide large storage capacities and access to the backup data from a variety of locations.

Unfortunately, remote backup services can be costly due to service fees, additional equipment, and the like. In addition, remote backup services can be difficult or complicated to use. For example, in order to set up a backup service, a user may have to purchase additional equipment or software as well as configure these items. This complexity leads to many users failing to use backup services or to use these services infrequently.

Moreover, remote or online backup services have the additional uncertainly of having to transmit data over a network. The security of the data communications or the remote backup may be compromised. Also, if network communications are disrupted, a user's backup of their files may be disrupted. Thus, a user may be uncertain as to whether their backups are being performed securely or completely.

SUMMARY

In an embodiment, a storage device is configured to work with a remote backup service and comprises a storage, an interface capable of communicating with the remote backup service, a processor configured to determine a status of backing up at least a portion of contents stored in the storage with the remote backup service, and a visual indicator indicating the status.

Additional features of the embodiments will be set forth in part in the description which follows, and in part will be obvious from the description, or may be learned by practice of the embodiments. The advantages of the embodiments can be realized and attained by means of the elements and combinations particularly pointed out in the appended claims. It is to be understood that both the foregoing general description and the following detailed description are exemplary and explanatory only and are not restrictive of the embodiment, as claimed.

BRIEF DESCRIPTION OF THE DRAWINGS

The accompanying drawings, which are incorporated in and constitute a part of this specification, illustrate embodiments of the invention and together with the description, serve to explain the principles of the embodiments. In the Figures.

DESCRIPTION OF THE EMBODIMENTS

The embodiments provide an external drive that is configured to coordinate with an online data backup service and provide a perceptible indication of the status or progress of backing up contents of the external drive. Upon the user's request or as an automatic function, the external drive backs up its contents to a backup storage. In some embodiments, the backup storage is provided by an online backup service remotely via a network, such as the Internet. Alternatively, the external drive may be configured to backup its content to another storage location that is local, such as a network attached storage device coupled to the same local area network.

With an audiovisual indicator, the external drive provides the user at least one form of perceptible feedback that may reassure the user that the contents of the external drive are being successfully backed up. For example, the various stages of the backup process may be indicated by changes in the color of the indicator lights, flashing patterns, different sounds, or any combination of these indication signals. The audiovisual indicator may also provide audio feedback, such as various tones, vibrations, etc., as an indication of the backup for the external drive.

In some embodiments, the external drive may be configured to cooperate with one or more online backup services. The users may be charged various fees for use of these backup services as well as optional features of the backup services. For example, the user may be charged fees based on, among other things, the amount of data being backed up, a number of external drives or hosts that are being backed up, the number of versions of content that are maintained by the backup service, the length of time that content is archived by the backup service, and the desired support level provided by the backup service, such as access to human operators and mean time to restoration. In addition, the users may be offered other variations and upgrades for the backup services, such as encryption, different levels of redundancy of the backup storage, recovery services, etc.

Figure 1A:
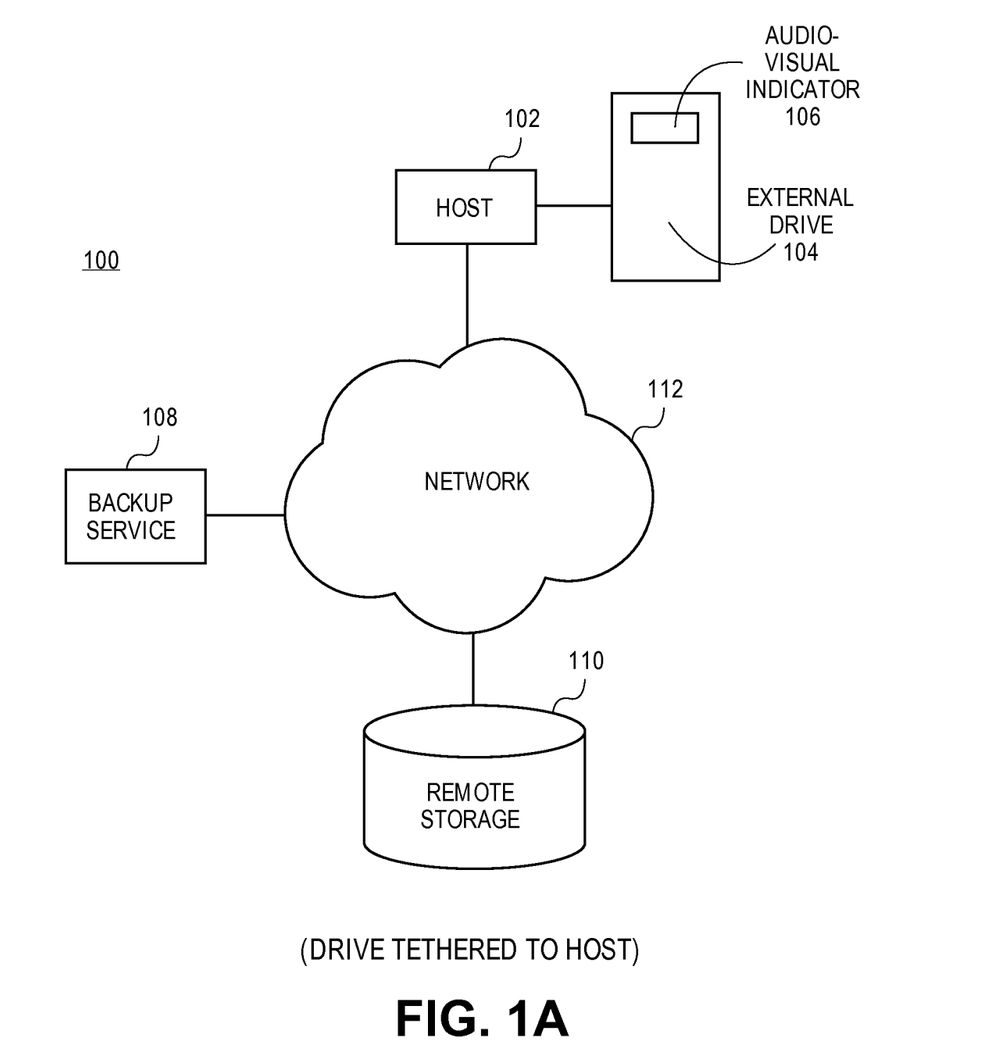
FIGS. 1A-1C show block diagrams of exemplary systems that are consistent with the present disclosure.
Figure 1B:
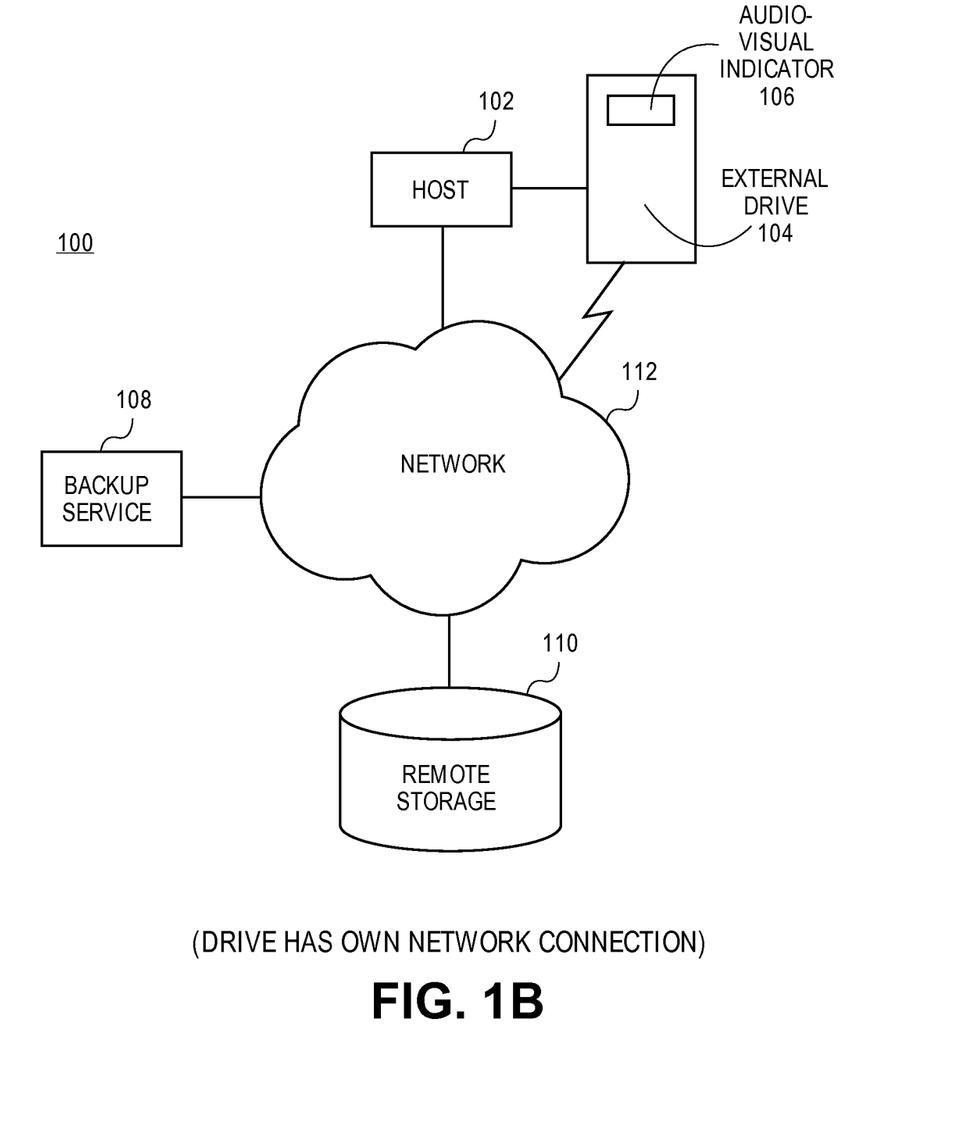
Figure 1C:
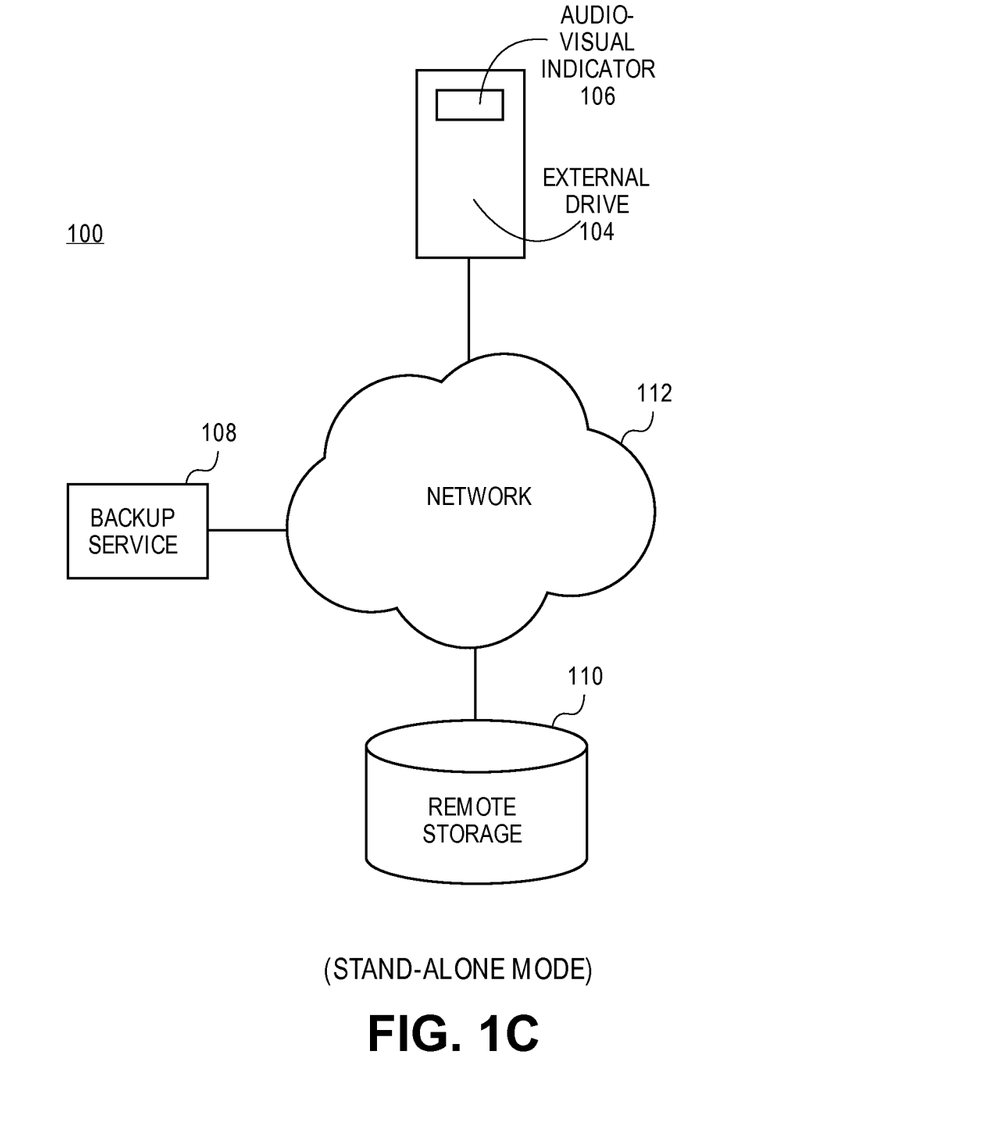

Various embodiments of the present disclosure will now be described with reference to the accompanying figures, wherein like numerals may refer to like elements throughout. FIGS. 1A-1C show an exemplary system 100 that is consistent with the present disclosure. In particular, FIG. 1A illustrates an embodiment in which an external drive with a visual indicator of online backup is connected or tethered to a host device, such as a personal computer, a laptop computer, and the like. FIG. 1B illustrates an embodiment in which the external drive is tethered to a host device, but is capable of establishing its own communications with an online backup service. FIG. 1C illustrates an embodiment in which the external drive is capable of operating as a stand-alone device and can backup its contents to an online backup service without the need for a host device. These various embodiments will now be further described below.

Referring now to FIG. 1A, a system 100 may comprise a host device 102, an external drive 104 having an audiovisual indicator 106, a backup service 108, a remote storage 110, and a network 112. In the embodiment shown, the external drive 104 is coupled or tethered to the host device, such as a personal computer, as an accessory. Accordingly, the external drive 104 is configured to communicate with the backup service 108 and remote storage 110 via the network interface provided by the host device 102. These components will now be further described below.

Host device 102 represents any of a wide variety of devices that may be used by a user for accessing their files. For example, the host device 102 may be a personal computer, a laptop computer, etc. Alternatively, host device 102 may be implemented as other kinds of devices, such as iPods, iPads, mobile phones, MP3 players, and the like. That is, host device 102 may be any device that can be coupled to an external storage device, such as the external drive 104.

External drive 104 is a storage device on which a user may store their data, files, content, etc. For example, the external drive 104 may comprise a storage medium, such as a hard disk, flash memory, and the like, and associated storage controller hardware, firmware, and software. For example, the external drive 104 may be implemented based on components and products, such as those made by Western Digital Technologies, Inc. Of course, the external drive 104 may employ a variety of forms of storage, such as a solid-state drive, hybrid drive, and/or the like.

In the embodiment shown in FIG. 1A, the external drive 104 is configured so that it is tethered or coupled to another device, such as host device 102. For example, the external drive 104 may comprise various wired and wireless interfaces, such as USB, Firewire, Bluetooth, WiFi, WiMax, etc., through which it connects to the host device 102. Accordingly, in the embodiment shown in FIG. 1A, the external drive 104 relies on the connections of the host device 102 to network 112 to communicate in system 100.

As shown, the external drive 104 may be configured to work with an online service, such as backup service 108, and may include audiovisual indicator 106 to indicate a status of the backup service 108 with the external drive 104. In particular, audiovisual indicator 106 may provide a perceptible audiovisual indication to a user regarding the status of communications with the backup service 108 or the status of backing up the contents of external drive 104. Audiovisual indicator 106 may be implemented using well-known audio and visual components, such as LEDs, audio speakers, etc.

Figure 7:
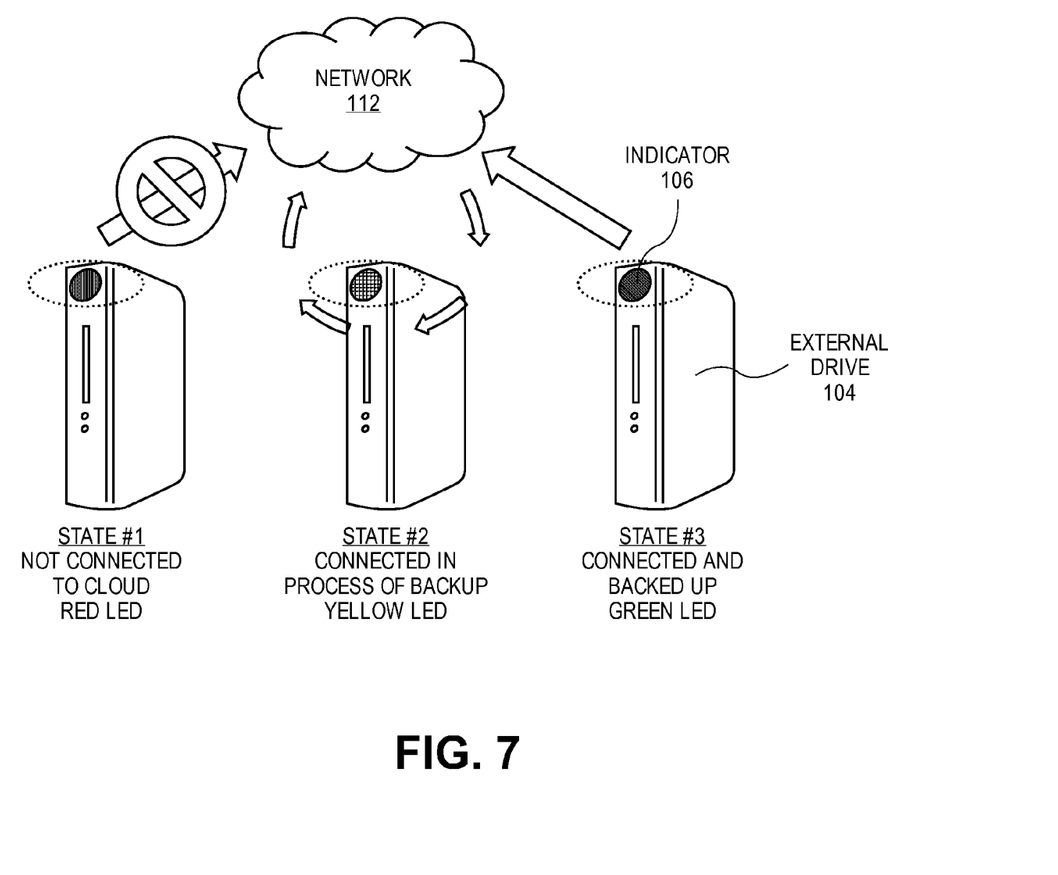
FIG. 7 shows some exemplary visual indications that may be provided by the external drive of the present disclosure.

In the embodiments, the audiovisual indicator 106 may provide perceptible audio and visual feedback in a wide variety of forms, such as different colors, flashing patterns, sounds, tones, and the like. For example, as shown in FIG. 7, the audiovisual indicator 106 may display different colors, such as red, yellow, and green, to indicate the status of the external drive 104 and its workings with the backup service 108. Alternatively, the audiovisual indicator 106 may indicate status using other configurations, such as a linear array of indicator lights, a circular array of indicator lights, etc. Any type of perceptible indication may be employed in the embodiments. In some embodiments as illustrated in FIG. 1A, the host 102 may comprise software to control the audiovisual indicator 106, which essentially responds to commands from the host software. In other embodiments, application software or firmware may reside and operate on external drive 104.

Backup service 108 represents a service for backing up and storing the content stored on external drive 104. In some embodiments, host device 102 may comprise a client software program (provided from backup service 108) that requests a backup at predetermined intervals, such as once per day, or upon request by the user. Upon request, this program may then identify, gather, compress, and transfer various contents from the external drive 104 to the remote storage 110 of the backup service 108. The host device 102 may access backup service 108 using a conventional software application, such as a web browser, word processor, photo viewer, etc., in order to access the files archived by backup service 108.

In the embodiments, the external drive 104 may be preconfigured or readily configured to work with backup service 108. For example, the backup service 108 may recognize the external drive 104 as a device designed to work with the backup service 108. The backup service 108 may recognize the external drive 104 based on a variety of criteria or mechanisms. In particular, the backup service 108 may be provided a serial number or other unique identification for the external drive. A user of the external drive 104 may also register the external drive 104 with the backup service, for example, when purchasing or first using the external drive 104.

In some embodiments, the external drive 104 may be preconfigured or configured, for example, with a URL or network address for the backup service 108 or the remote storage 110. Indeed, upon being tethered or storing new files to the external drive 104, a message or pop-up menu may be displayed on the host device 102 indicating that the contents of the external drive 104 can be backed up to the backup service 108 or the remote storage 110. Thus, the external drive 104 may allow the user to employ backup service 108 with little or no entry of configuration settings and with relative ease compared to conventional methods and systems.

In the embodiments, the external drive 104 may be configured to backup its contents to varying degrees with the backup service 108. For example, as noted, the external drive 104 may backup its contents at various intervals, such as once per day, once per hour, etc. Alternatively, the external drive 104 may be configured to provide a continuous data protection service in which the contents of the external drive are continuously backed up to remote storage 110, such as whenever a change to a file or the creation of a new file is detected.

The external drive 104 may also be optimized to backup different types of files. For example, the external drive 104 may backup multimedia files, such as pictures, videos, music, etc. with a higher priority because of their value to the user. As another example, files, such as emails, email archive files, and the like, may be backed up on a more frequent schedule from the external drive 104 than other content. The external drive 104 may also be configured to perform backups across a variety of platforms, such as files for Windows, Mac OS, Linux, UNIX, etc.

In some embodiments, the external drive 104 is configured to facilitate compression of its contents for backup in order to minimize the amount of data that needs to be transferred to remote storage 110. For example, the external drive 104 may employ differential compression or lossless compression of its contents in order to minimize the amount of data that needs to be transmitted to the remote storage 110. Furthermore, the backup of the external drive 104 may employ other optimizations to minimize the bandwidth needed for online backup to the remote storage 110.

Remote storage 110 serves as a storage location for backing up the contents of the external drive 104. Remote storage 110 may be implemented using well-known systems and components. In the embodiments, the remote storage 110 may be provided at a single site, or multiple sites. For example, remote storage 110 may store data at a primary site and provide redundancy at other secondary sites that offer geographic or system diversity.

Network 112 represents the communication infrastructure for system 100. For example, network 112 may comprise various local area and wide area networks. In addition, network 112 can comprise both voice and data networks known by those skilled in the art. In some embodiments, network 112 comprises the Internet. Of course, network 112 may represent other networks that couple the components of system 100.

FIG. 1B shows another embodiment of the present disclosure. In particular, as shown in FIG. 1B, the external drive 104 may still be tethered or coupled to the host device 102, but may also comprise network communications capabilities in addition to its storage capabilities. For example, external drive 104 can comprise its own network interface, such as a wired or wireless network interface, to network 112 and communicate directly with backup service 108 and remote storage 110. In these embodiments, the external drive 104 may thus backup its contents without the involvement of host device 102, if desired.

In some embodiments, the external drive 104 may have a selectable bandwidth configuration to control the amount of network communications it uses via its network interface for an online backup. The bandwidth configuration may be controlled by the user or may be controlled automatically by the external device 104 or a software client running on the host device 102. For example, the external device 104 may be configured to use higher bandwidths in the evening and lower bandwidths during the day in order to minimize the intrusiveness of the online backup.

In addition, the external drive 104 may also utilize the network communications link of the host device 102 in combination with its own link. For example, the external drive 104 may use the communications link of the host device 102 as the primary communications link with network 112. In the event of a communications failure or poor performance, the external drive 104 may then divert some or all of the communications to its own communications link with the network 112. Of course, the audiovisual indicator 106 may provide various forms of perceptible indications, such as a change in color, flashing pattern, or sound or tone, when the external drive 104 changes its communications mode. Again, control over the audio-visual indicator 106 may reside within suitable programming operating on the host 102 or may be contained within external drive 104.

Referring now to FIG. 1C, the external drive 104 may be capable of operating as a self-enclosed or stand-alone device that is relatively portable for the user. In these embodiments, the external drive 104 allows the user to backup the contents of the external drive 104 independent of any host device. As a stand-alone capable device, sometimes referred to as network attached storage (NAS), in addition to its storage components, the external drive 104 may comprise a display, user input, such as a keyboard or touch screen, and the like. The external drive 104 may further comprise its own network communications interface that is wired or wireless so that it may backup its contents to another storage device.

As a stand-alone device, the external drive 104 may be capable of having online access to its files stored on remote storage 110. For example, the external drive 104 may comprise software, such as a web browser or a viewer, which allows the external drive 104 to access, and if needed, download a file from the remote storage 110.

Regardless of whether it is a companion or stand-alone device, the external drive 104 may provide various security measures to protect its content. For example, the external drive 104 may comprise encryption software and hardware that secures the contents in its storage media from unauthorized access during transfer to the remote storage 110. The external drive 104 may also cooperate with a software application running on the host device 102 to encrypt its communications when interfacing with the remote storage 110, e.g., transfer encryption.

Furthermore, the external drive 104 may be configured to have its contents encrypted when stored. Accordingly, the contents of the external drive 104 may be transmitted and stored in remote storage 110 in encrypted form. In these embodiments, the external drive 104 may be provided a key for the encryption. The key may be generated by a client application running on the host device 102, or may be encoded within the external drive 104, such as in firmware or hardware.

In yet other embodiments (not shown in FIGS. 1A-1C), the external drive 104 may be configured to backup its contents to another local storage device. For example, the external drive 104 may be configured to recognize when another storage device, such as flash drive, another external drive, or a second NAS device or other type of storage device is on the same network or coupled to the external drive 104. Accordingly, the external drive 104 may easily and efficiently transfer its contents to another external drive or other type of storage device without a network.

Figure 2:
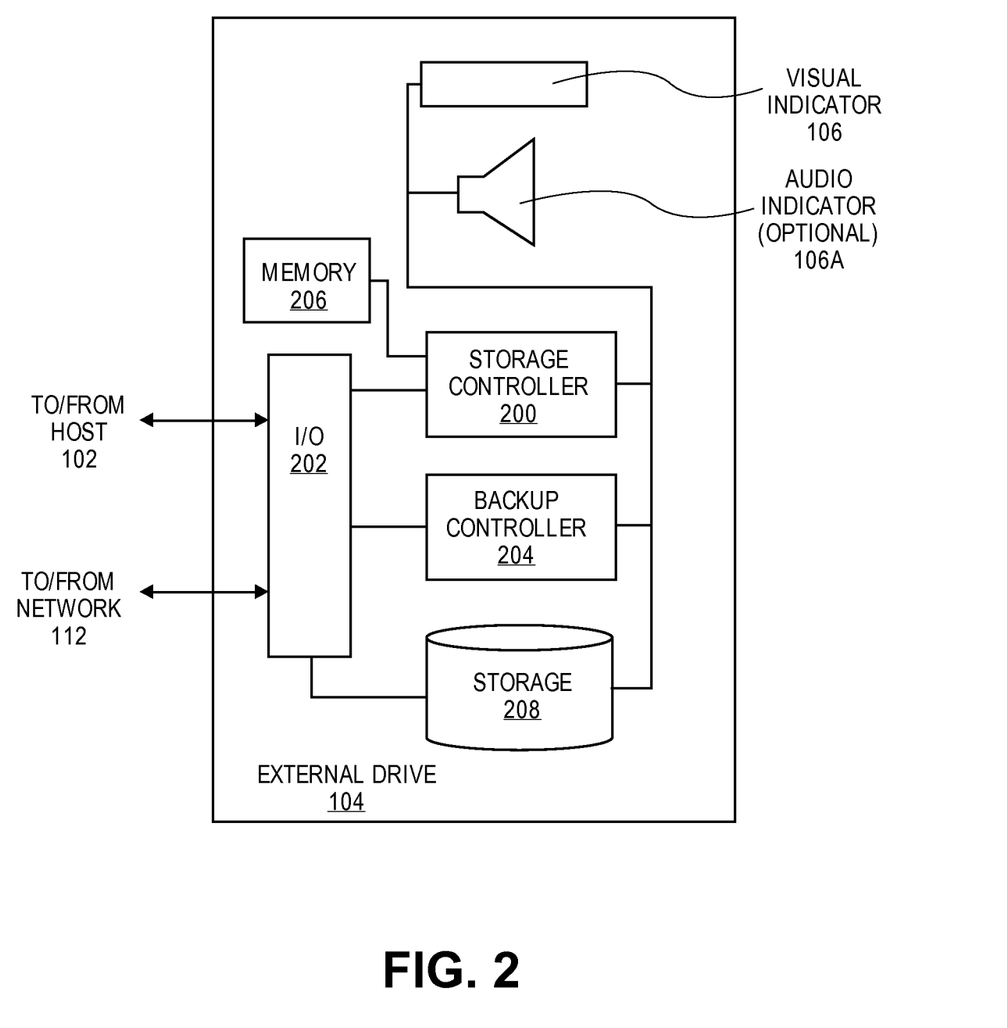
FIG. 2 shows a block diagram of an exemplary external drive in accordance with an embodiment of the present disclosure.

FIG. 2 shows an exemplary external drive 104 in accordance with an embodiment of the present disclosure. As shown, external drive 104 may comprise a visual indicator 106, an audio indicator 106A (optional), a storage controller 200, an input/output 202, a backup controller 204, a memory 206, and a storage medium 208. These components will now be described to illustrate the principles of the present disclosure and the embodiments.

Storage controller 200 represents the logic and circuitry that carries out the storage control functions of external drive 104. For example, storage controller 200 may be a general purpose CPU, such as those made by Intel Corporation. Alternatively, storage controller 200 may be implemented using other forms of processors and circuitry. For example, storage controller 200 may be implemented based on a field-programmable gate array (FPGA) or application specific integrated circuit (ASIC).

Storage controller 200 may also be configured to control the operations of visual indicator 106 and audio indicator 106A. In particular, storage controller 200 may coordinate with backup controller 204 to determine the status and progress of a backup from the external drive 104. Based on this information, the storage controller 200 send the appropriate signals to visual indicator 106, for example, for changes in the color of the indicator lights, flashing patterns, display patterns, and the like to indicate the status or progress of the backup. The storage controller 200 may also send appropriate signals to the audio indicator 106A for the output of different sounds or tones based on the progress or status of the backup. In some embodiments, the storage controller 200 works with software running on the host 102 to collectively control the visual indicator 106 and the audio indicator 106A. In other embodiments, the storage controller 200 may be implemented with its own application software or firmware to control the operations of the visual indicator 106 and audio indicator 106A.

Input/Output 202 serves as the communications interface for external drive. For example, input/output 202 may comprise interfaces, such as SCSI, USB, IEEE 1394, Fire Wire, eSATA, HDMI, and the like to allow external drive to connect to other devices, such as host device 102. Input/output 202 may further or alternatively comprise a network interface card, a wireless network interface controller, a network adapter, a local area network adapter, or other type of network communications interface to connect to a wired or wireless network 112.

Backup controller 204 represents the logic and circuitry that carries out the backup control functions of external drive 104. For example, backup controller 200 may be a general purpose CPU, such as those made by Intel Corporation, executing software instructions to implement the backup functions provided by the external drive 104. Alternatively, backup controller 204 may be implemented using other forms of processors and circuitry. For example, backup controller 204 may be implemented based on a field-programmable gate array (FPGA) or application specific integrated circuit (ASIC). Backup controller 204 may also be implemented based on software or program code that is running on a processor for the external drive 104. Alternatively, the backup controller 204 may be integrated into the storage controller 200 as one of its components.

Memory 206 serves as a temporary storage memory for external drive 104. For example, the memory 206 may temporarily store the contents of a file as it is being compressed or decompressed. The memory 206 may be used to store other items, such as the location of the backup service 108 and remote storage 110 for use by the backup controller 204, as well as an encryption key. Moreover, memory 206 may serve as the storage for instructions being executed by storage controller 200 and the backup controller 204. Memory 206 may be implemented using various types of memory both volatile and non-volatile. For example, memory 206 may be implemented using RAM, DRAM, ROM, PROM, EPROM, EEPROM, flash memory, etc.

Storage 208 is a storage medium of external drive 104. In various embodiments, the storage 208 may be implemented as one or more hard disk drives, such as those made by Western Digital Technologies. Of course, storage 208 may be implemented based on other forms of storage, such as a solid-state drive, hybrid drive, and/or the like.

Figure 3:
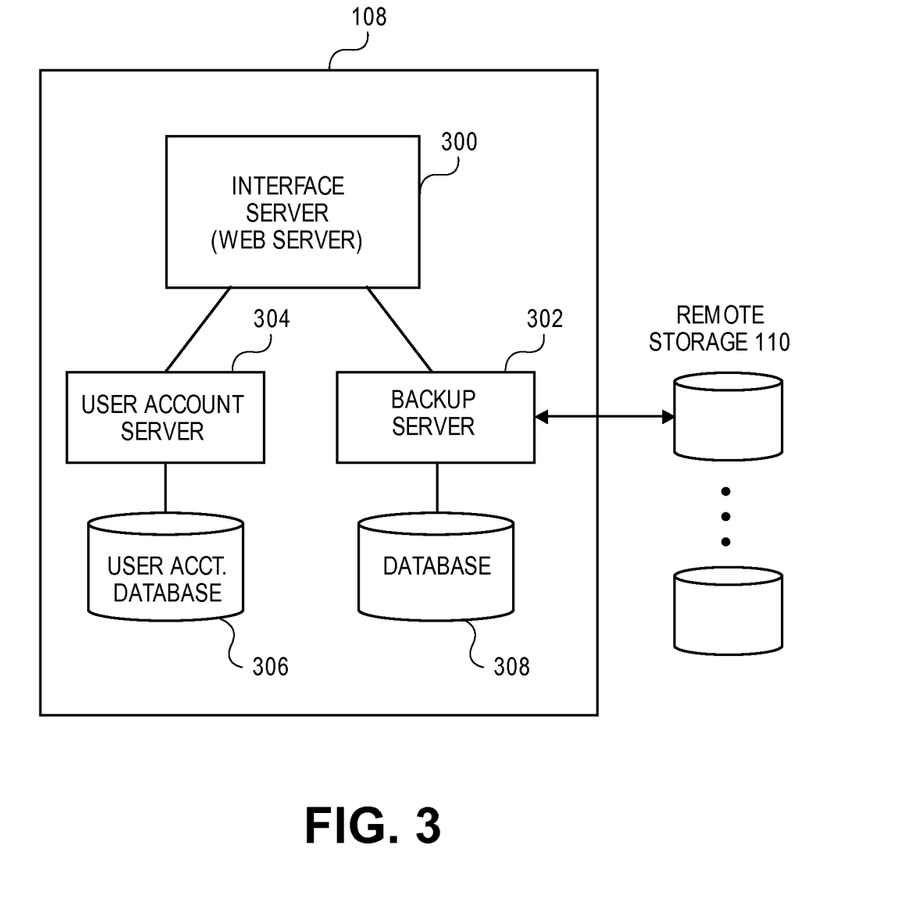
FIG. 3 shows a block diagram of an exemplary backup service in accordance with an embodiment of the present disclosure.

FIG. 3 shows an exemplary backup service 108 in accordance with an embodiment of the present disclosure. As shown, the backup service 108 may comprise an interface or web server 300, a backup server 302, a user account server 304, a user account database 306, and a backup database 308. These components may be implemented using known hardware, firmware, and software that is shared or dedicated to them. For example, these components may be implemented on one or more machines executing the servers as software. Alternatively, the components of backup service 108 may be implemented on a collection of machines that are local or remote to each other The components of backup service 108 may be coupled together in various ways. For example, these components may be devices connected together via bus, a local area, or wide area network. In addition, these components may communicate with each other using known protocols and standards, such as HTML, CGI, CORBA, Java, etc. For example, the components of backup service 108 may employ Service Oriented Architecture (SOA) web services in order to interface with each other. These components will now be briefly described.

Web server 300 serves as the front-end interface for backup service 108 and provides information to other components of backup service 108. In particular, web server 300 may provide an interface that is accessible via external drive 104 or host device 102 over network 112. Web server 300 may be implemented using well-known hardware and software. In addition, web server 300 may support well known standards, such as HTML, CGI, etc. in order to communicate within system 100.

Backup server 302 processes the request for backups to and from remote storage 110. Such components are known to those skilled in the art. For example, backup server 302 may maintain an inventory of previous versions of backups, a history of transactions for backups, etc. In addition, the backup server 302 may obtain and track data concerning each individual content item, such as version information, timestamps, file size, file type, etc.

User account server 304 maintains user identification and account information for the backup service 108. Such components are known to those skilled in the art. For example, user account server 304 may maintain a history of transactions by a user, and maintain an account for users, such as logins, passwords, financial information, and the like.

User account database 306 provides an organized repository for user transactions and history with backup service 108. For example, user account database 306 may be implemented using conventional database management systems to allow backup service 108 to create, maintain, search, and access information about a user and the user's media collection 102. In addition, user account database 306 may support various querying languages, such as SQL, MySQL, and the like.

Backup database 308 comprises the hardware and software for providing an organized repository for the backups of content from the external drive. For example, backup database 308 may be implemented using conventional database management systems to allow backup service 108 to create, maintain, search, and access information about content and its authorized versions. In some embodiments, the backup database 308 comprises a wide variety of information about content, such as the content's file name, file size, file type, folder information, encryption information, and other metadata.

As shown in FIG. 3, the backup server 302 may utilize the information in backup database 308 to track the backups from the external drive 104 that is stored in remote storage 110. In the present disclosure, storage 110 is referred to as a remote storage in that it is remote from the external drive 104. In some embodiments, the remote storage 110 may be a component or reside within the backup service 108. Alternatively, the remote storage 110 may also be remote located from the backup service 108.

Figure 4:
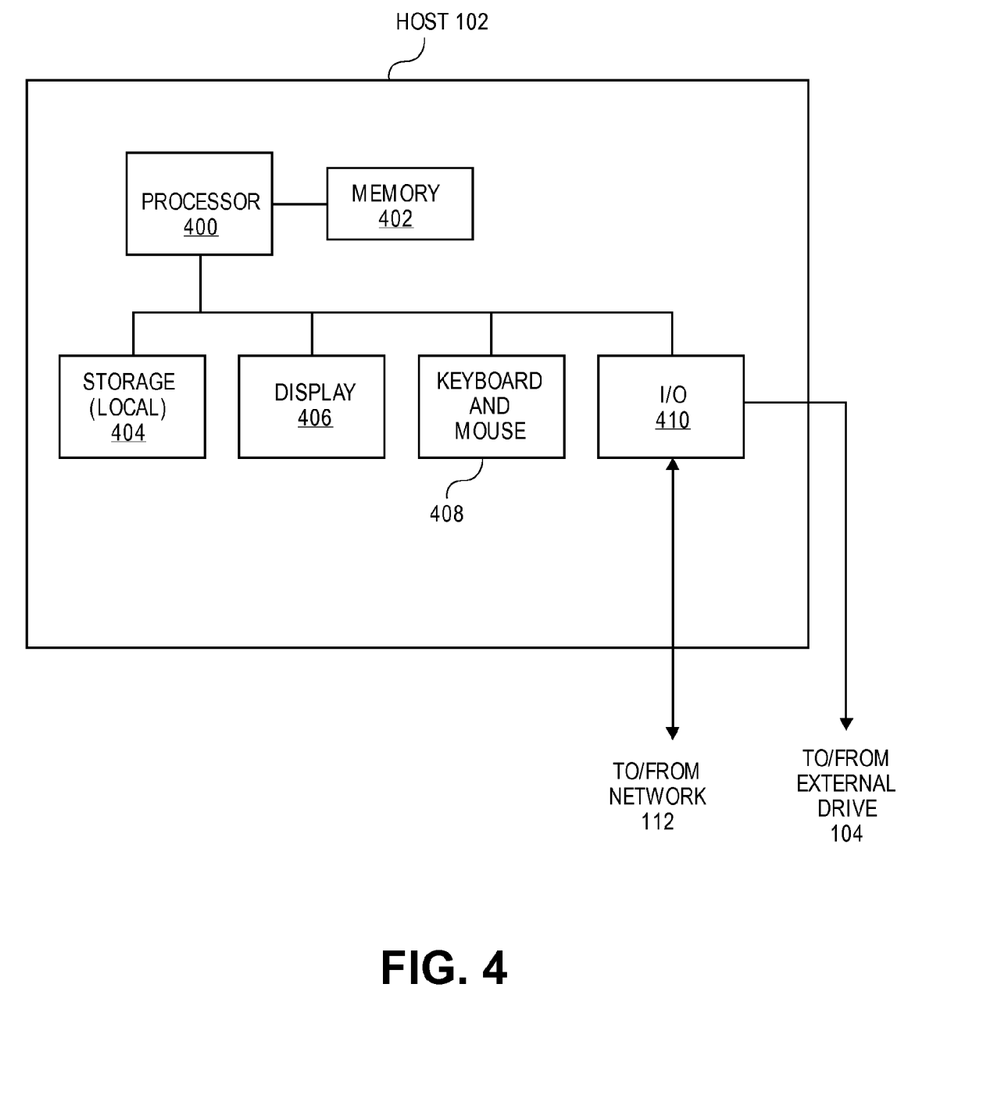
FIG. 4 shows an exemplary host in accordance with an embodiment of the present disclosure.

FIG. 4 shows an exemplary embodiment of the host device 102. As shown, the host device 102 may be a general-purpose computer that comprises a processor 400, a memory 402, a local storage 404, a display 406, and one or more user interface devices 408, such as a keyboard and mouse, and input/output 410. Such components are well known to those skilled in the art. In addition, the host device 102 may execute software, such as an operating system and applications, to support the various methods of the embodiments. For example, as noted above, in some embodiments, the host device 102 may execute a client application that works with the external drive 104 to backup various files and content. As yet another example, the host device 102 may execute applications, such as a web browser or word processor, which may be used with the external drive 104.

Figure 5:
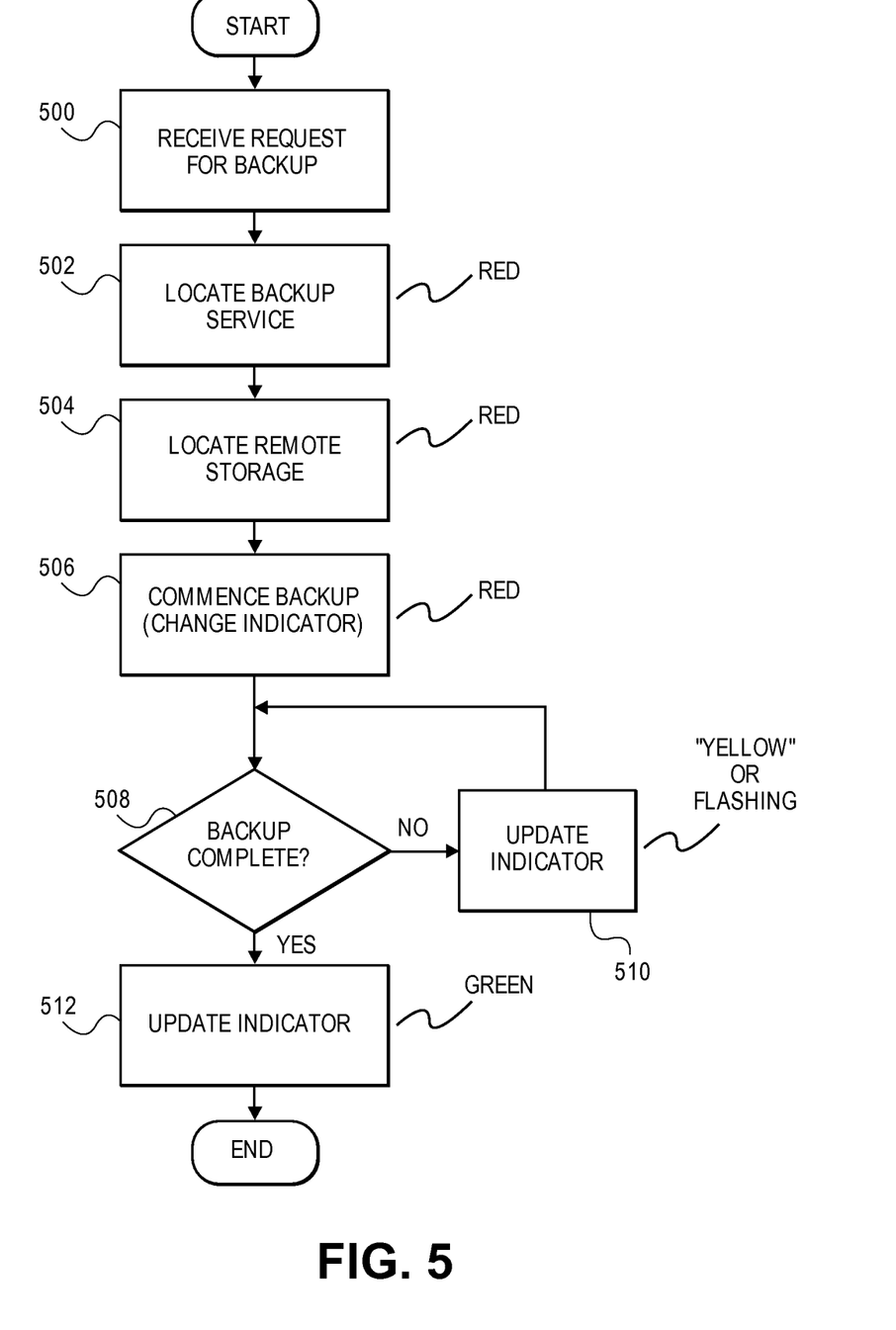
FIGS. 5-6 show an exemplary process flow for obtaining an authorized version of multimedia content in accordance with the present disclosure.

FIG. 5 shows an exemplary process flow in accordance with an embodiment of the present disclosure. In general, the process relates to a user backing up files that have been stored on the external drive 104. For purposes of illustration, the process flow is described in relation to the contents of the external drive 104 being backed up to an online backup service 108 over a network, such as the Internet.

At stage 500, a request for backup of the external drive 104 is received. The request may be triggered in different ways. For example, the user may request a backup by actions taken on the host device 102. Alternatively, the user may request a backup of the external drive 104 by selecting or pressing a button provided on the external drive 104.

The request for a backup of the external drive 104 may be triggered automatically. For example, a client application running on the host device 102 may request a backup of the external drive 104 based on passage of a time interval or based on when one or more files have changed sufficiently. In other embodiments, the external drive 104 is configured to request a backup either on its own or through the host device 102.

In stage 502, the backup service 108 is located. During this stage, the audiovisual indicator 106 may provide an appropriate indication. For example, the storage controller 200 of the external drive 104 may query the backup controller 204 and receive information that indicates the backup has not yet commenced. Accordingly, the storage controller 200 may control visual indicator 106 to display an appropriate indication, such as a display of a red color. Alternatively, software running on host device 102 may provide a command or data to the external drive 104 to display an appropriate indication, such as the display of a red color. In some embodiments, the user may simply enter a location, such as a URL or other type of address, for the backup service 108. In other embodiments, when the external drive is tethered to the host device 102, the host device 102 may locate the backup service 108 based on configuration settings previously provided by the user or based on configuration settings provided by the external drive 104. Alternatively, the host device 102 may determine the location of the backup service 108 based on information collected from the external drive 104 and provide this information to the user for confirmation. For example, the host device 102 may read an identifier, such as a MAC address, serial number, or URL, which is included on the external drive 104. The host device 102 may then submit this identification information to a website, such as a website of the manufacturer, for the location of the backup service 108. In other embodiments, the external drive 104 may perform these tasks for locating the backup service 108 using its own network communications path with network 112 or via the host device 102.

In some embodiments, the host device 102 and the external drive 104 are configured to perform backups and provide perceptible indications to the user to make the backup process as simple as possible for a user. Accordingly, much of the backup process and update of indications may be performed in an automatic fashion without the need for user input or response. In other embodiments, for security purposes, the host device 102 or the external drive 104 may have to perform various authentication tasks, such as providing a user login and password entered by the user, or credentials unique to the external drive, such as device id, etc. When locating the backup service 108, the user may be offered a variety of options. These options may be presented via an interface on host device 102, such as a display, or on a display of external drive 104 (if external drive 104 comprises a user interface).

In stage 504, the remote storage 110 is located. In some embodiments, the location of the remote storage 110 to be used for a backup is provided by the backup service 108. Alternatively, the location of a desired remote storage 110 may be specified by the user through the host device 102 or may be configured based on information included in the external drive 104.

During this stage, the audiovisual indicator 106 may continue to display an appropriate indication, such as a red color. The audiovisual indicator 106 may also modify its indication to show progress of the process, such as altering the flashing pattern of the red light or displaying additional lights and colors.

In stage 506, the backup to remote storage 110 from the external drive 104 commences. As noted above, the contents of the external drive 104 may be transferred via the host device 102 or via a communications link provided by the external drive 104. In addition, the communications between the external drive 104 and the remote storage 110 may be secured, such as with encryption or via SSL communications.

During this stage, the audiovisual indicator 106 may be updated to indicate that the backup of the external drive 104 has commenced or is in process. For example, the audiovisual indicator 106 may change its flashing pattern, display additional lights, or display different colors, such as yellow. Alternatively, the audiovisual indicator 106 may also play or output a sound or tone to indicate the progress of the backup.

In stage 508, the status of the backup is monitored and the audiovisual indication is appropriately updated. For example, the host device 102 may monitor the progress of the backup and provide status information to the external drive 104. In response, the external drive 104 may then change the indications provided by its audiovisual indicator 106. In other embodiments, the backup controller 204 monitors the status of the backup of the external drive 104 and alters the output of the audiovisual indicator 106 accordingly.

During stage 510, the backup is in progress and the audiovisual indicator 106 may indicate various aspects of the progress of the backup in different ways. For example, the audiovisual indicator 106 may change colors, such as to yellow, as well as its flashing pattern. In particular, the audiovisual indicator 106 may accelerate or slow the flashing pattern to indicate the progress of the backup. Alternatively, the audiovisual indicator 106 may display different numbers of lights, such as lights arranged in a linear array or circular array, to show a user the progress of the backup.

In stage 512, the backup has completed and the audiovisual indicator 106 is updated accordingly. For example, the audiovisual indicator 106 may change colors, such as to green, as well as its display pattern, such as a change in flashing frequency, brightness, etc. In addition, the audiovisual indicator 106 may also play or output a sound or tone to indicate the completion of the backup.

Figure 6:
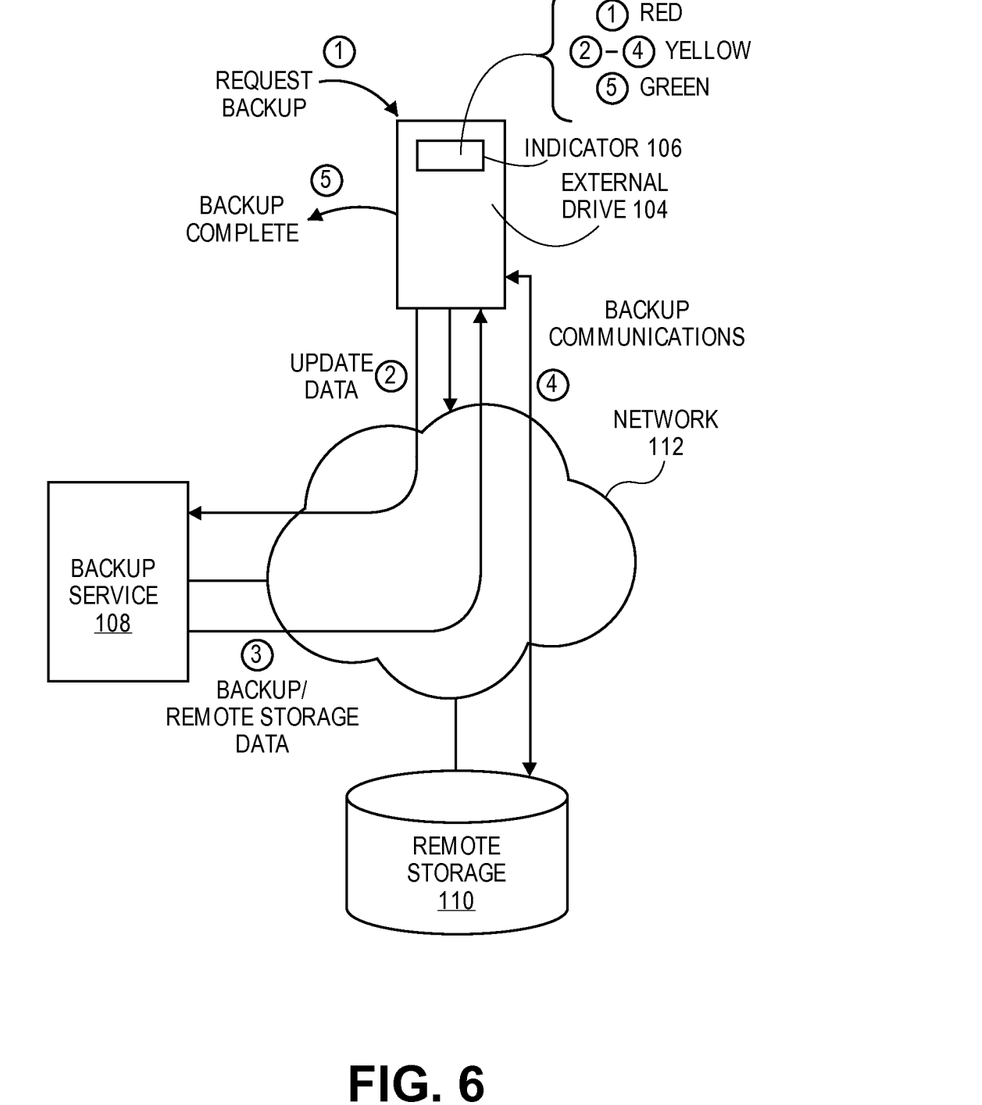

FIG. 6 shows another exemplary process flow in accordance with an embodiment of the present disclosure. In particular, FIG. 6 is provided to illustrate how the audiovisual indicator of the external drive 104 is updated during various communication stages of a backup. In the embodiment shown, the audiovisual indicator 106 may display a red color initially, a yellow color during progress of the backup, and a green color once the backup has been completed.

As shown, first, a backup is requested. As noted above, the backup may be requested by a user via the host device 102 (not shown in FIG. 6) or by the external drive 104 itself. The audiovisual indicator 106 may initially display a red color to indicate that the external drive 104 contains at least some data that is not backed up to another device or backup service 108.

Second, the external drive 104 may transmit via the network 112 update data, such as information from the request, the files that need to be backed up, etc., to the backup service 108. During this stage, the audiovisual indicator 106 may display a yellow color to indicate that the external drive 104 has contacted the backup service 108.

Third, the backup service 108 provides to the external drive 104 location information for the remote storage 110. During this stage, the audiovisual indicator 106 may continue to display a yellow color.

Fourth, the external drive 104 establishes communications with the remote storage 110 and begins to transfer its contents for the backup. During this stage, the audiovisual indicator 106 may continue to display a yellow color. Of course, the audiovisual indicator 106 may be altered to indicate the progress of the backup to the remote storage 110, for example, via a changing display pattern or other perceptible indications, such as a sound or tone.

Fifth, the external drive 104 completes its backup to the remote storage 110. Accordingly, the audiovisual indicator 106 may change its display and show a green color. The audiovisual indicator 106 may also output a tone or sound to indicate the completion of the backup.

FIG. 7 shows some exemplary visual indications of the audiovisual indicator 106 that may be provided by the external drive 104. As shown, when the external drive 104 is not connected to the network 112 (or to either the backup service 108 or the remote storage 110), the audiovisual indicator 106 may display a red LED to the user. However, when the external drive 104 is connected to the network 112 or in the process of a backup with the backup service 108 and remote storage 110, the audiovisual indicator 106 may display a yellow LED. Finally, when the external drive 104 is connected to the network and the backup completed, the audiovisual indicator 106 may display its green LED.

Other embodiments will be apparent to those skilled in the art from consideration of the specification and practice of the embodiment disclosed herein. For example, the registration service and content sources may be combined as a single service. Alternatively, the registration service may offer a plurality of content sources for content that is being registered. Moreover, two external drives 104 may comprise NAS drives that are oriented as a primary drive and a backup drive. In such a state, a simple home network, for example, may provide the backbone to have consistent backup of data. A simple glance at an indicator 106 of the primary drive can provide assurance that its contents are backed up on the backup drive. It is intended that the specification and examples be considered as exemplary only, with a true scope and spirit of the embodiment being indicated by the following claims.

What is claimed is:

1. A storage device configured to work with a backup service, said storage device comprising:
   a storage medium;
   an interface configured to communicate with the backup service, the backup service being configured to implement a backup by transferring copy of at least a portion of content stored in the storage medium to the backup service;
   a processor configured to:
      request, without user input, a storage device-initiated backup;
      determine a status of communications between the interface and the backup service and, upon determination of a communications failure or poor performance, changing a communications mode with the backup service; and
      determine as status of the backup with the backup service; and
   a visual indicator configured to indicate, responsive to the requested storage device-initiated backup;
      the determined status of communications between the interface and the backup service;
      a change in the communications mode with the backup service; and
      during the backup with the backup service, the determined status of the backup.

2. The storage device of claim 1, wherein the interface is configured to communicate with the backup service via a host computer.

3. The storage device of claim 1, wherein the interface is configured to communicate with the backup service via a network.

4. The storage device of claim 1, wherein the processor is configured to initiate the backup based on a time interval.

5. The storage device of claim 1, wherein the processor is further configured to initiate the backup based on a request by the user of the storage device and wherein the visual indicator is further configured to indicate, responsive to the request by the user, the determined status of communications between the interface and the backup service and, during the backup with the backup service, the determined status of the backup.

6. The storage device of claim 1, wherein the processor is further configured to initiate the backup based upon detection of an event and wherein the visual indicator is further configured to indicate, responsive to detection of the event, the determined status of communications between the interface and the backup service and, during the backup with the backup service, the determined status of the backup.

7. The storage device of claim 1, wherein the determined status of communications comprises a current status of a connection of the storage device with a network.

8. The storage device of claim 1, wherein the determined status of communications comprises a current status of a connection of the storage device with the backup service.

9. The storage device of claim 1, wherein the determined status of communications comprises a current status of a change in the content stored in the storage medium.

10. The storage device of claim 1, further comprising an audio indicator configured to provide an audio indication of at least one of the determined status of communications and the determined status of the backup.

11. A method for backing up data from a storage device to a backup service, the method comprising:
   requesting, without user input, a storage device-initiated backup, the storage device comprising a storage medium and an interface configured to communicate with the backup service, the backup service being configured to implement a backup by transferring a copy of at least a portion of content stored in the storage medium to the backup service;
   determining a status of communications between the interface and the backup service and, upon determination of a communications failure or poor performance, changing a communications mode with the backup service; and
   determining a status of the backup with the backup service; and
   actuating a visual indicator to indicate, responsive to the requested storage device-initiated backup;
      the determined status of communications between the interface and the backup service;
      a change in the communications mode with the backup service; and
      during the backup with the backup service, the determined status of the backup.

12. The method of claim 11, wherein the interface is configured to communicate with the backup service via a host computer.

13. The method of claim 11, wherein the interface is configured to communicate with the backup service via a network.

14. The method of claim 11, wherein requesting comprises requesting the storage device-initiated backup based on a time interval.

15. The method of claim 11, wherein requesting comprises requesting the storage device-initiated backup based on a request by the user of the storage device and wherein actuating causes the visual indicator to indicate, responsive to the request by the user, the determined status of communications between the interface and the backup service and, during the backup with the backup service, the determined status of the backup.

16. The method of claim 11, wherein requesting comprises requesting the storage device-initiated backup based upon a detection of an event and wherein actuating causes the visual indicator to indicate, responsive to detection of the event, the determined status of communications between the interface and the backup service and, during the backup with the backup service, the determined status of the backup.

17. The method of claim 11, wherein the determined status of communications comprises a current status of a connection of the storage device with a network.

18. The method of claim 11, wherein the determined status of communications comprises a current status of a connection of the storage device with the backup service.

19. The method of claim 11, wherein the determined status of communications comprises a current status of a change in the content stored in the storage medium.

20. The method of claim 11, wherein the storage device further comprises an audio indicator and wherein the method further comprises generating, using the audio indicator, an audio indication of at least one of the determined status of communications and the determined status of the backup.

* * * * *